United States Patent [19]
Liang

[11] Patent Number: 5,329,729
[45] Date of Patent: Jul. 19, 1994

[54] PLANT IRRIGATION SYSTEM
[76] Inventor: Simon Liang, P.O. Box 82-144, Taipei, Taiwan
[21] Appl. No.: 86,990
[22] Filed: Jul. 7, 1993
[51] Int. Cl.⁵ ..................... A01G 27/00; A01G 25/00
[52] U.S. Cl. ............................................. 47/81; 47/66
[58] Field of Search ........................ 47/79, 81, 67, 66

[56] References Cited
U.S. PATENT DOCUMENTS

| | | | |
|---|---|---|---|
| 3,069,807 | 12/1962 | Wall | 47/81 |
| 4,782,627 | 11/1988 | Hauk | 47/81 |
| 4,805,342 | 2/1989 | Jenkins | 47/79 |

FOREIGN PATENT DOCUMENTS 2223388  4/1990 United Kingdom .................... 47/81

Primary Examiner—Henry E. Raduazo
Attorney, Agent, or Firm—Morton J. Rosenberg; David I. Klein

[57] ABSTRACT

This invention relates to a plant irrigation system and in particular to one including a reservoir for receiving water, having an upper indicating line and a lower indicating line on the outer surface thereof for denoting the highest and lowest water levels respectively, an inlet on the top thereof for filling water therein, a cap engageable with the inlet for preventing water from evaporating and flowing out thereof, an outlet on the top thereof, a first mounting plate arranged on the top thereof and having two openings, and a second mounting plate formed on the top thereof and having two slits; a hook having two protuberances engageable with the two openings of the first mounting plate so that the hook is detachably connected with the reservoir and can be adapted for use to various flower pots; a plastic pipe having a lower end to be extended into the reservoir through the outlet of the reservoir and an upper end to be buried into the soil in a flower pot; a wick enclosed within the plastic pipe; and a spade for digging the soil, with a flexible and wrinkly strap for being firmly inserted through the slit of the second mounting plate and a fastening means designed for keeping the plastic pipe in position, burying the plastic pipe into the soil, and providing further fixation for the reservoir onto the flower pot; whereby the plant irrigation system utilizes capillary action to transmit water from the reservoir to a plant in a flower pot via the wick enclosed in the plastic pipe thereby automatically controlling and adjusting required amount of water to meet different demands of various plants in different living environments.

1 Claim, 3 Drawing Sheets

PLANT IRRIGATION SYSTEM

BACKGROUND OF THE INVENTION

It has been found that a disk is often placed under a flower pot so as to receive excessive water for preventing the water from overflowing to contaminate the environment. However, since the disk and the flower pot are closely connected together, this will block the air convection and may have a large number of mosquitoes and the like develop there. In addition, it is unfortunate that many expensive plants often die of excessive or insufficient water. Hence, many attempts have been made to provide a watering system which can automatically control and adjust the required amount of water to the plant. Nevertheless, all watering systems in the market are impractical and inconvenient to use, and they are too complicated in structure and too expensive in cost.

In U.S. Pat. No. 1,231,975 to Weitzel 2d, a watering attachment for flower-pots is disclosed. Such a device includes an annular container for receiving water, hinged arms adapted to be swung inwardly for engagement with upper edge of the flower pot, and a needle valve for providing intermittent dropping of the water from the container into the flower pot. However, the Weitzel reference utilizes a mechanical means to supply constantly a certain amount of water to the flower pot and so it cannot automatically control and adjust the required amount of water to the plant. Further, it is necessary to mount the watering device on a flower pot before the flower or the like is planted in the flower pot. Furthermore, once the flower is planted in the flower pot, it will be very difficult and inconvenient to dismount the watering device therefrom. Moreover, such a watering device must be adapted to a corresponding flower pot and cannot be used for larger or smaller flower pots. In addition, the structure thereof is too complicated thus making it infeasible for mass production and popular uses.

In U.S. Pat. No. 1,231,976 to Weitzel 2d, the device for watering flower pots is designed to regulate and adjust the water flow to drip at a constant rate at all times. This device mainly comprises a circular closed tank engageable with the upper edge of a flower pot, a wall partitioning the tank into a large supply chamber and a small feed chamber, a valve connection between the large supply chamber and the small feed chamber, and an adjustable valved discharge outlet. Nevertheless, as the previous U.S. Pat., this reference still fails to suggest a device which can automatically control and adjust the required amount of water to the plant. Besides, the device according to this reference is inconvenient in use and also complicated in structure.

U.S. Pat. No. 1,400,628 to Rudolph teaches a self-irrigating flower pot which utilizes an absorbent wick extending from a water chamber to the soil within the flower pot and controls the quantity of water supplied to the soil by drawing a U-shaped rod upward through the rotation of a nut so as to compress the absorbent wick against a plate. Although this reference obviates the drawback of the above-mentioned two U.S. patents, this reference is not an independent watering system and must be specially designed and constructed with a flower pot thus increasing the cost thereof. In addition, the hooks according to this reference cannot be adapted for use to flower pots with various sizes. This reference is impractical in household use and also complicated in structure.

Another watering system is disclosed in U.S. Pat. No. 2,747,332, entitled "FLOWER POT WATERING DEVICE", and designed for providing continuous moisture for the soil within a flower pot so that the flower pot may be left unattended for a certain period of time. Such a device makes use of an absorbent wick to transfer water from a receptacle through a tubular stake and guide member projected into the soil within the flower pot. Anyhow, this reference must be disposed on a higher position than the flower pot and cannot be directly hanged on the flower pot thereby causing much inconvenience in use.

U.S. Pat. No. 2,799,121 to Modeweg, entitled "PLANT IRRIGATING DEVICE", discloses a device aimed at facilitating the controlled irrigation of potted plants from a central reservoir. This device includes a central reservoir, a tubular member, a spring clip surrounding the tubular member, a nozzle adapted to be inserted into the soil within a flower pot, a rotatable sleeve member mounted on the nozzle, and an absorbent wick. However, this reference is designed for supplying water to a plurality of flower pots in a garden at the same time and cannot be conveniently mounted on various flower pots. Accordingly, this reference is only suitable for gardening and is in no way relevant to the subject invention.

In U.S. Pat. No. 3,069,807 to Wall, entitled "DEVICE FOR WATERING AND FEEDING PLANTS, FLOWERS AND THE LIKE", a device for watering and feeding plants is disclosed. Such a device mainly comprises a water container hanged on the upper edge of a flower pot and a tube extending from the water container to the bottom of the flower pot so that the water will flow into the soil within the flower pot by a capillary or combined capillary and siphon system. Nevertheless, this reference cannot be adapted for use to flower pots with different sizes and furthermore, this reference is inconvenient to use, as it is necessary to use a separate spade to dig up all the soil in the flower pot and bury the lower part of the tube into the lowest part of the interior of the flower pot before using this device.

U.S. Pat. No. 4,067,143 to Alwell, entitled "PLANT WATERING REMINDER", is directed to a plant watering device adapted for use to a flower pot. Such a device comprises a housing means engageable with the upper edge of a flower pot, a retaining means for keeping the housing means in a fixed position, a reservoir for receiving water, a fluid transferring means extending from the reservoir into the soil within the flower pot, and a stop means for preventing the fluid transferring means from falling down. Nevertheless, as the previous U.S. patent to Wall, this watering device cannot be adapted for use to flower pots with different sizes hence making it inconvenient to use. In addition, it is necessary to plant the flower or the like in the flower pot after mounting the device thereon, which is not practical at all. Besides, once the flower is planted in the flower pot, it will be very difficult to dismount the device therefrom.

U.S. Pat. No. 4,115,951 to Becker et al, entitled "APPARATUS FOR SUPPLYING FLUIDS TO POTTED PLANTS", concerns a plant watering apparatus which is designed to be removably associated with potted plants. Such a device includes a fluid reservoir having a cover, a soil probe unit having an axially extending wick receiving passage, an absorbent wick extending from the fluid reservoir into the passage of the probe, and a sliding door for changing the area of the absorbent in contact with the soil within the flower pot. However, this reference is not suitable for use with small flower pots and the sliding door will increase the cost thereof. Furthermore, it is necessary for people to remove the whole device from the flower pot when they desire to adjust the sliding door thus rendering it inconvenient and impractical in use.

U.S. Pat. No. 4,430,829 to Zeltner et al, entitled "MOISTURE CONTROL APPARATUS", discloses an apparatus for controlling moisture content in soil within a flower pot. However, this reference fails to disclose a watering system for supplying water to a flower pot. Further, this reference does not suggest or teach a watering system which can be conveniently mounted on the upper edge of a flower pot in use.

In the U.S. Pat. No. 4,782,627 to Hauk, entitled "PLANT FEEDING AND WATERING METHOD AND APPARATUS", a plant watering system is disclosed. According to this reference, the system includes a container for receiving fluid, a first absorbent wick, a second absorbent wick, a means for retaining part of the first absorbent wick in constant contact with the part of the second absorbent wick, and a plate-shaped member for controlling contact area between the first absorbent wick and the second absorbent wick. Anyway, this reference is too complicated in structure and as all the above-mentioned references, it is still necessary to use a separate tool to dig up the soil and bury the absorbent into the soil within the flower pot before use. Besides, such a plant watering system cannot be adapted for use to flower pots with different sizes.

Australian Pat. No. AU-A-35258/89 to Schadel, entitled "WATERING WAND", discloses a plant watering system which includes a fluid reservoir and a wick extending from the reservoir to the vicinity of roots of the plant wherein the wick is used for conveying water by capillary action from the reservoir to the plant and the wick is provided with an inner core and a substantially moisture impervious cover. However, the watering system according to this application cannot be adapted for use to flower pots with various sizes and still requires a separate spade to bury the wick into the flower pot.

Australian Pat. No. AU-A1-71 275/81 to Few, entitled "PLASTIC IRRIGATION BAG", is related to a watering device which includes a reservoir for containing water, an opening formed in the upper part of the reservoir, an outlet formed in the lower part of the reservoir and communicating with a flexible tube, and a flow rate control valve for controlling the flow of water from the reservoir through the flexible tube. Nevertheless, as the previous Australian Pat. to Schadel, the hanger according to the said Few reference is fixedly connected with the reservoir and cannot be replaced with a larger one for adapting to a larger flower pot. In addition, it is still necessary to use a separate tool to dig up the soil and bury the supply tube therein. Furthermore, such watering device cannot automatically control and adjust the required amount of water to the plant.

Australian Pat. No. AU-A-27485/84, entitled "PLANT WATERER", is related to a portable plant waterer which includes a storage vessel adapted to be filled with water and having a waterproof tube, means for supporting the vessel in a position generally above the soil surrounding a plant, and a wick within the waterproof tube extending from within the vessel at the lowermost point in use through the tube to the outside of the vessel. However, the storage vessel is difficult to be supported firmly, and it will occupy a considerably large space when supported above the surface of the soil in a flower pot thereby obstructing the growth of the plant and the job of plant care. In addition, there is no indication of water refill and water consumption. Furthermore, it also needs a separate tool to dig the soil to fix this waterer. Accordingly, this reference is impractical in use.

International publication No. WO 87/06095, entitled "AUTOMATIC WATERING SYSTEM FOR PLANTS IN POTS OR IN OPEN GROUND", is directed to a system for automatically watering plants in the flower pot or in the open ground. The system utilizes a wick enclosed in a waterproof tube to transfer water in a receptacle to a flower pot. However, this reference cannot be conveniently mounted on a flower pot. In addition, the water regulator is complicated in structure and difficult to judge in practical use. Further, it is necessary to use a separate spade to dig up the soil in the flower pot and bury the lower part of the tube into the flower pot hence causing much inconvenience in use.

Therefore, it is an object of the present invention to provide an improved plant irrigation system which may obviate and mitigate the above-mentioned drawbacks.

SUMMARY OF THE INVENTION

This invention relates to a plant irrigation system.

It is the primary object of the present invention to provide a plant irrigation system which utilizes the capillary principle to transmit water from a reservoir to the plant in a flower pot via a wick enclosed within a plastic pipe thereby automatically controlling and adjusting the required amount of water to the various plants due to the fact that the water absorbing rate will change with the capillary pressure caused by the soil humidity through the wick.

It is another object of the present invention to provide a plant irrigation system which will automatically supply and adjust water to the plant by capillary principle according to its needs thus keeping the surrounding environment clean and keeping the plant alive while the plant owner is away from home.

It is still another object of the present invention to provide a plant irrigation system which can be easily and conveniently hanged on the rim of various flower pots and re-filled with supplementary water.

It is still another object of the present invention to provide a plant irrigation system which can show the water consumption rate of the plant and remind the plant owner to refill the water easily and conveniently.

It is still another object of the present invention to provide a plant irrigation system which is provided with a spade for facilitating digging up the soil in the flower pot, offering a fastening means to firmly fix the wick enclosed within a plastic pipe, burying the wick into the soil firmly in the soil, and providing further fixation for the plant irrigation system on a flower pot for any possible accident.

It is still another object of the present invention to provide a plant irrigation system which is provided with detachable hooks for easily and conveniently adapting to various kinds and shapes of flower pots as a simple attachment.

It is a further object of the present invention to provide a plant irrigation system which is simple in structure, low in cost, easy in fabrication, and convenient in use.

The other objects and merits and a fuller understanding of the present invention will be obtained by those having ordinary skill in the art when the following detailed description is read in conjunction with the accompanying drawings wherein like numerals refer to the like or similar parts.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
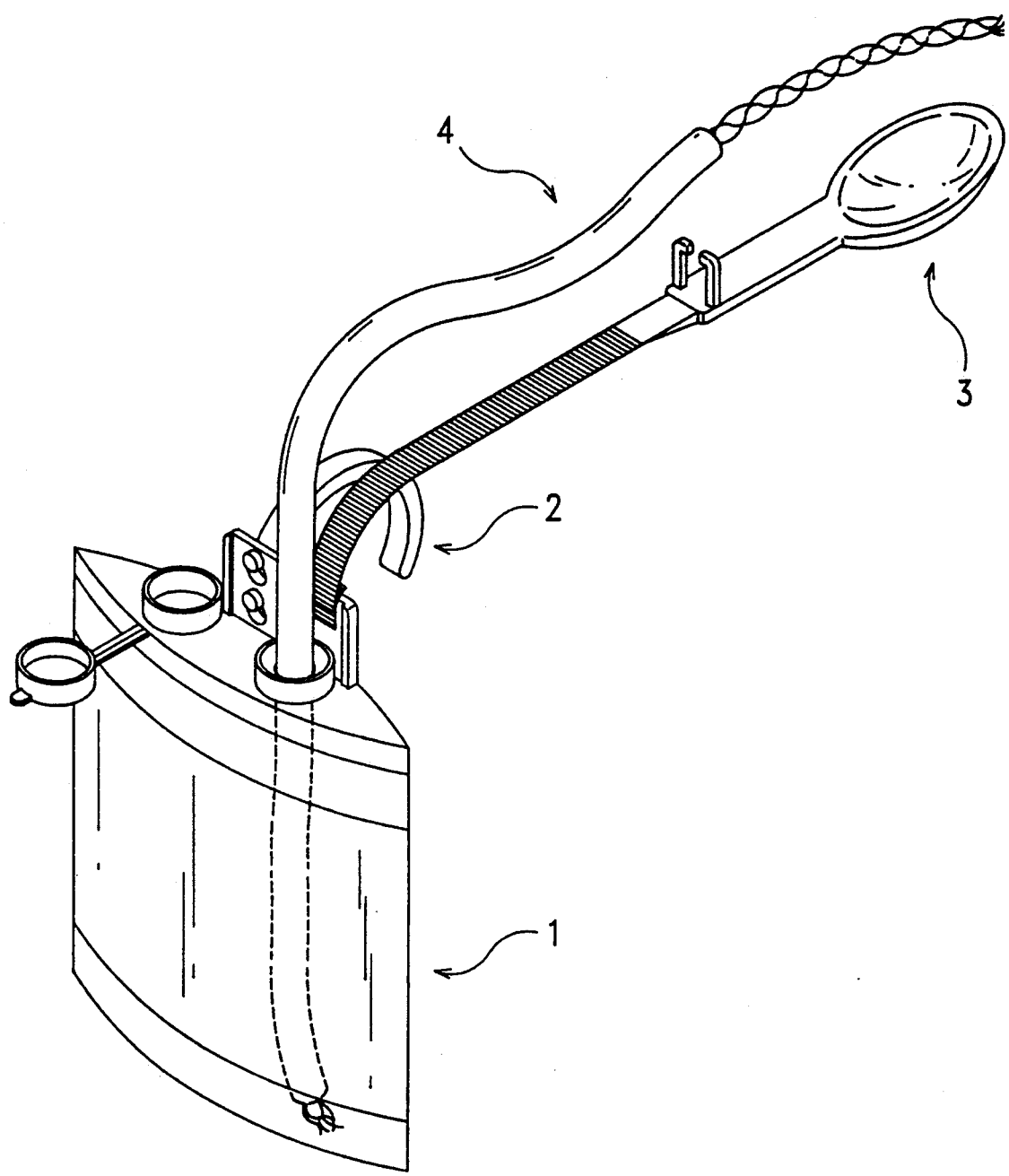
FIG. 1 is a perspective view of a plant irrigation system according to the present invention.

With reference to the drawings and in particular to FIG. 1 thereof, the present invention mainly comprises a reservoir 1, two hooks 2, a spade 3, and a water transmitting device 4. The reservoir 1 is integrally made of plastic by molding and can be conveniently made into any desired shapes. The outer surface of the reservoir 1 may be printed with patterns so as to match and embellish the plant in the flower pot.

Figure 2:
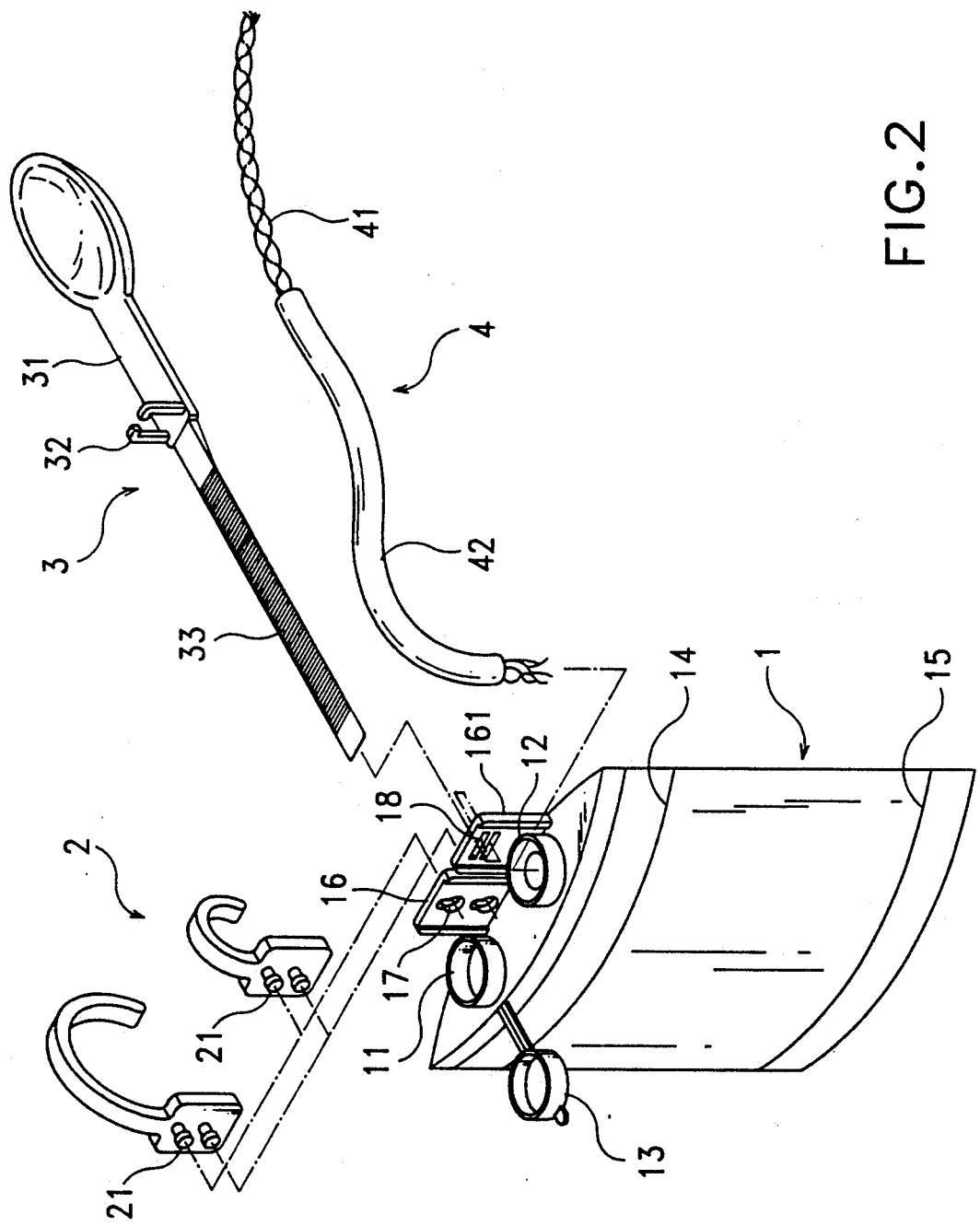
FIG. 2 is an exploded view of the plant irrigation system.

Referring now to FIGS. 1 and 2, the reservoir 1 is formed at the top with a water inlet 11 and a water outlet 12. The water inlet 11 is a way through which water can be poured into the reservoir 1. It should be noted that the water can be blended with required nutrients in advance. Further, the reservoir 1 is provided with a cap 13 which is used for closing the water inlet 11 so as to prevent the water therein from evaporating as well as overflowing out of the water reservoir. An upper indicating line 14 and a lower indicating line 15 are marked on the outer surface of the reservoir 1 for denoting people the full level of water and added level of water for refilling, respectively. On the top of the reservoir 1 there is a first mounting plate 16 which is formed with two openings 17. The hook 2 is a curved piece of metal or plastic for hanging the reservoir 1 on a flower pot A (see FIG. 3). In addition, the hook 2 is provided with two protuberances 21 which can be snap-fitted into the openings 17 of the first mounting plate 16. The two hooks 2 are of different sizes so as to adapt for use to various kinds of flower pots. On the top of the reservoir 1 there is a second mounting plate 161 formed with two slits 18 and located adjacent to the water outlet 12. The spade 3 is provided with a handle 31, a fastening means 32, and a fixing strap 33. The fixing strap 33 is made of flexible material such as plastic or the like and has knurls on its surface so that when the fixing strap 33 is inserted through the slit 18 of the second mounting plate 161, the knurls of the fixing strap 33 will be engaged with the slit 18 of the second mounting plate 161 thereby keeping the fixing strap 33 in firm position. The water transmitting device 4 includes a plastic pipe 42 and a wick 41 inserted in the plastic pipe 42. The plastic pipe 42 together with the wick 41 is inserted into the reservoir 1 through the outlet 12, with its one end located below the lower indicating line 15 on the outer surface of the reservoir 1. The other end of the plastic pipe 42 is kept in place by the fastening means 32 of the spade 3 so as to prevent the plastic pipe 42 from moving out of position when subjected to impact.

Figure 3:
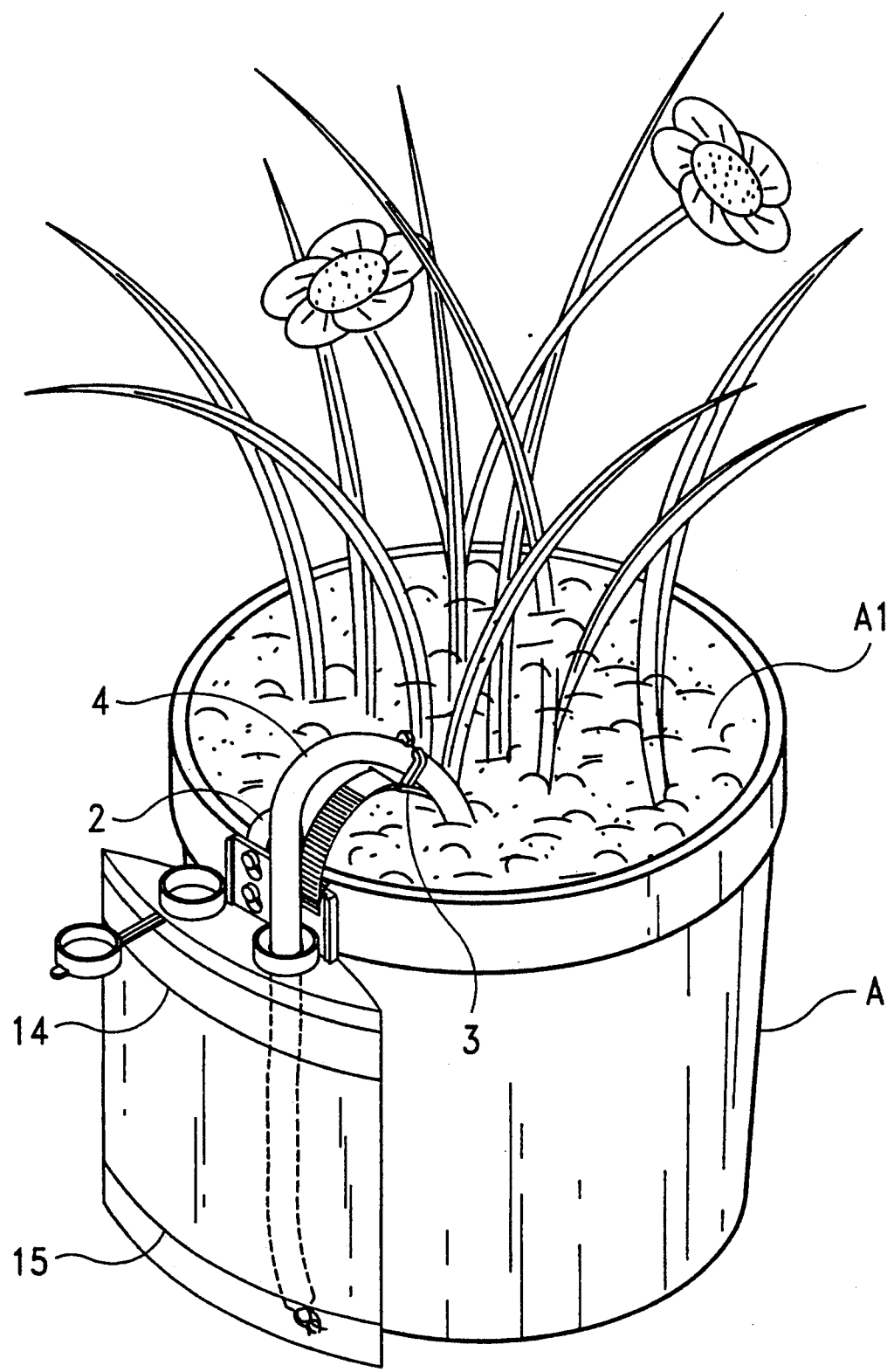
FIG. 3 is a working view of the plant irrigation system.

As shown in FIG. 3, there is shown a working view of the present invention. When in use, first choose a hook 2 with a size adapted to the thickness of the side wall of the flower pot A and engage it with the first mounting plate 16. Then, engage the hook 2 with the upper edge of the flower pot A so that the present invention is firmly hanged on the flower pot A. Thereafter, dig up the soil A1 in the flower pot A with the spade 3 and bury the spade 3 and the water transmitting device 4 into the soil A1. Thereafter, fill water into the reservoir 1 up to the upper indicating line 14. As the water level goes down to the lower indicating line 15, it is necessary to add water into the reservoir through the inlet 11.

The principle of the present invention resides in the capillary action which will cause water to be transmitted into the soil in the flower pot A from the reservoir 1 until humidity equilibrium is reached and capillary pressure disappears. As the plant absorbs water from the soil thereby reducing the water in the soil A1, drying the soil A1, and creating capillary pressure, the wick 41 enclosed within the plastic pipe 42 will absorb water from the reservoir and transmit it into the soil A1 in the flower pot A. The water transmitting rate depends on the actual need of the plant in the pot. That is to say, the more water the plant needs, the faster the water transmitting rate will be. Hence, the irrigation system according to the present invention will automatically supply required amount of water to the plant.

Further, the water may be blended with nutrients beforehand so as to promote the growth of the plant. The material and size of the wick 41 may be selected according to the size of the reservoir and the category of the plant while the size of the plastic pipe should be adapted to the wick 41 used.

In conclusion, the irrigation system according to the present invention utilizes the principle of capillary action to transmit water from a reservoir to the plant in the flower pot via the wick enclosed by a plastic pipe thus making it unnecessary to water the plant every day. Moreover, the water absorbing rate of the plant will change with the capillary pressure of the wick 6 thus automatically controlling and adjusting the required amount of water to meet the different demands of various plants in different living environments.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A plant irrigation system comprising:

a reservoir for receiving water, having an upper indicating line and a lower indicating line on the outer surface thereof for denoting the highest and lowest water levels respectively, an inlet on the top thereof for filling water therein, a cap engageable with the inlet for preventing water from evaporating and flowing out thereof, an outlet on the top thereof, a first mounting plate arranged on the top thereof and having two openings, and a second mounting plate formed on the top thereof and having two slits;

a hook having two protuberances engageable with the two openings of said first mounting plate so that the hook is detachably connected with said reservoir;

a plastic pipe having a lower end to be extended into said reservoir through the outlet of said reservoir and an upper end for burying into soil in a flower pot;

a wick enclosed within said plastic pipe; and a spade for digging the soil, having a flexible and wrinkly strap for being firmly inserted through the slits of said second mounting plate and having a fastening means for keeping said plastic pipe in position;

whereby the plant irrigation system utilizes capillary action to transmit water from the reservoir to a plant in a flower pot via the wick enclosed by the plastic pipe thereby automatically controlling and adjusting required amount of water to meet different demands of various plants in different living environments.

* * * * *